United States Patent [19]

Schatz

[11] Patent Number: 5,090,474

[45] Date of Patent: Feb. 25, 1992

[54] HEAT STORAGE MEANS

[76] Inventor: Oskar Schatz, Waldpromenade 16, DW-8035 Gauting, Fed. Rep. of Germany

[21] Appl. No.: 665,286

[22] Filed: Mar. 5, 1991

[51] Int. Cl.⁵ ............................................. F28D 20/00
[52] U.S. Cl. ........................................ 165/10; 165/41; 165/104.19; 137/590
[58] Field of Search .................. 165/10, 104.19, 41; 137/590

[56] References Cited

U.S. PATENT DOCUMENTS 1,863,273  6/1932  Hofferbert ...................... 165/104.19
4,436,058  3/1984  McAlister ........................ 165/104.19
4,556,171 12/1985  Fukami et al. .................. 165/104.19

FOREIGN PATENT DOCUMENTS 3614318 10/1987  Fed. Rep. of Germany ........ 165/10

Primary Examiner—Albert W. Davis, Jr.
Attorney, Agent, or Firm—Harness, Dickey & Pierce

[57] ABSTRACT

A heat storage means, and more particularly to a latent heat storage means for motor vehicle heating systems supplied by engine waste heat, comprises an inner container (10) with a storage core within it, an outer container (12) surrounding the inner container with a clearance with the formation of a preferably evacuated insulating space (14) and two ducts (16 and 18) extending through the insulating space (14), of which one duct serves as a supply duct and of which the other serves as a return duct for a heat vehicle fluid and both are arranged adjacent to the insulating space (14) in such a manner that they have a straight section (16b and 18b) which is as long as possible. The cross section of such duct sections has such a dense arrangement of permanently fitted elements running in the direction of flow that the periphery contacted by the fluid is, in comparison with the flow cross section, so large that convection is substantially prevented.

19 Claims, 1 Drawing Sheet

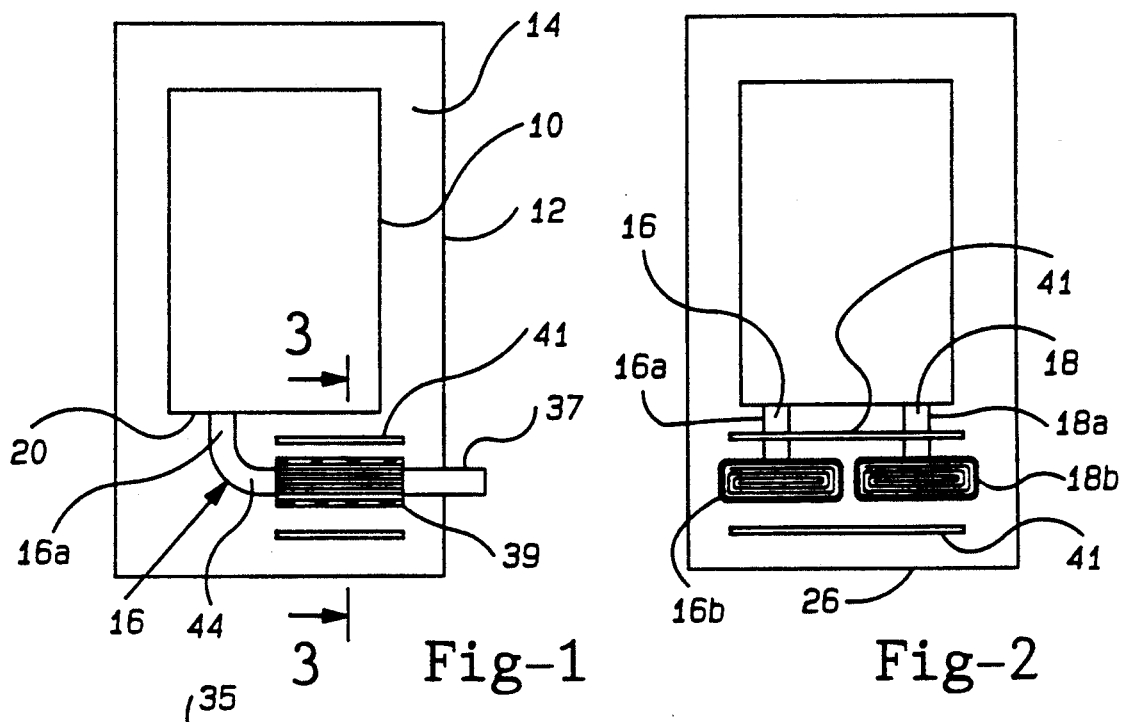
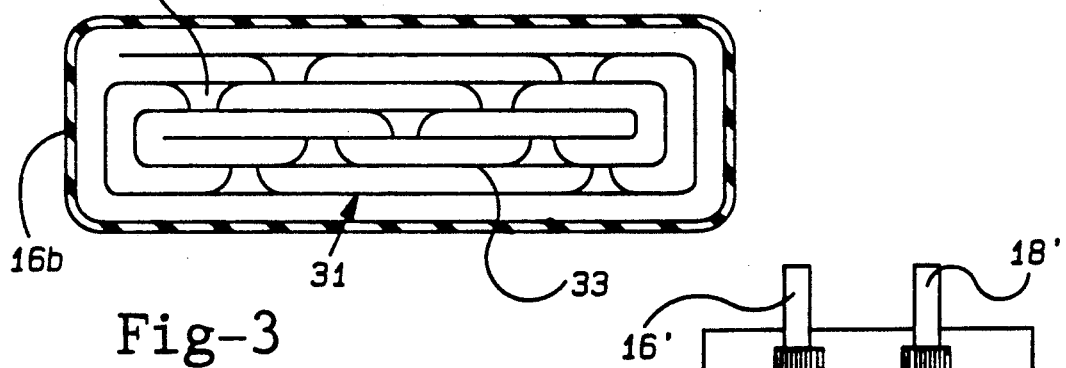
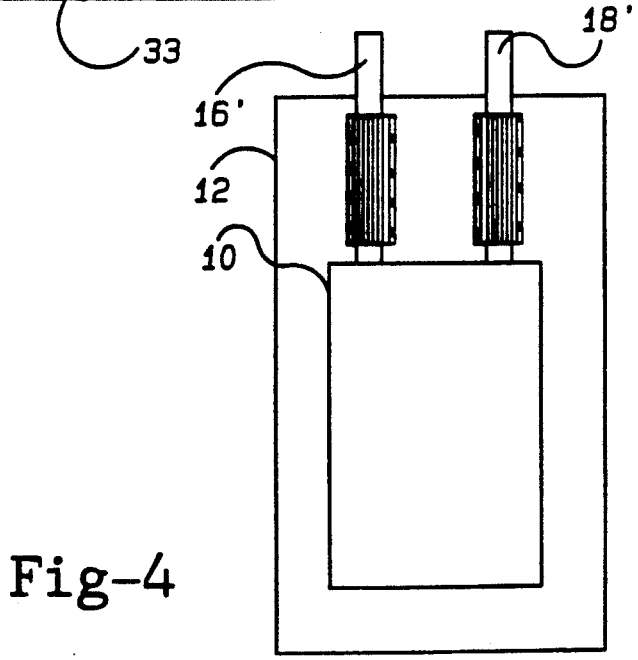

HEAT STORAGE MEANS

BACKGROUND OF THE INVENTION

The present invention relates to a heat storage means, and more particularly to a latent heat storage means for motor vehicle heating systems supplied by engine waste heat, comprising an inner container with a storage core within it, an outer container surrounding the inner container with a clearance with the formation of a preferably evacuated insulating space and two ducts extending through the insulating space, of which one duct serves as a supply duct and of which the other serves as a return duct for a heat vehicle fluid and both are arranged adjacent to the insulating space in such a manner that they have a straight section which is as long as possible.

A heat storage means of this type is described in the European patent application 0 294 500. The duct sections extending upwards and, respectively, downwards serve to for an insulating barrier layer, which is effective during the heat storing phase, in the heat vehicle fluid between the hot fluid present in the heat storage means and the fluid cooling outside the heat storage means so that heat losses, which would reduce the utility of the heat storage means via the ducts passing through the insulating space are prevented.

It is not in all applications, as for instance in private cars, that there is sufficient space available to make it possible to install a heat storage means in such a position as to lead to a duct section which is sufficiently long and/or suitable for the formation of a barrier layer.

SHORT SUMMARY OF THE PRESENT INVENTION

Accordingly one object of the invention is to modify a heat storage means of the type in which the formation of a sufficient barrier layer is not possible so that heat losses via the supply and return ducts are kept sufficiently low.

In order to achieve this or other objects appearing from the present specification claims and drawings, in the present invention the cross section of the straight duct sections have such a dense arrangement of fixedly mounted elements in running the direction of flow that the periphery contacted by the fluid is so large in comparison with the flow cross section that convection is suppressed.

This design is based on the consideration that by far the greater part of the heat lost is dissipated via the ducts passing through the insulating space owing to convection so that if the convection is substantially suppressed the desired insulating effect may be achieved, or nearly so, just in accordance with the general structure of the system.

The insulating effect may be supported by two further measures, that is to say by the formation of a barrier layer—which may not be sufficient as such—at the hot end of the straight duct section, if at this position there is a vertical duct section with a suitable direction, and by reduction of the flow of heat, which favors convection, and loss of heat, across the direction of the duct.

Accordingly one advantageous development of the invention is possible in which between the inner container and the straight horizontal section the ducts each have a duct section running at least approximately vertically downwards, dependent on the setting in which the heat storage means is installed.

As a result a barrier layer improving the overall insulating effect may be formed.

A further advantageous development of the invention is possible in which the elements form narrow ducts extending in the direction of the duct.

A further convenient form of the invention is such that the cross section of the duct section is filled up by a fiber glass plate, whose fibers are predominantly aligned in the direction of the duct.

In another possible form of the invention the cross section of the duct sections contains a number of parallel walls extending in the longitudinal direction of the duct and defining gaps between the, the walls being made of thermally insulating material if desired.

A further and particularly expedient embodiment o the invention is such that the duct section contain within them an element filling the cross section thereof in a spiral manner with a clearance between its turns, such element being provided with projections setting the distance between its turns.

As part of a further form of the invention the duct sections containing the internal elements are provided with an arrangement opposing the supply of heat and the loss of heat in a direction across the duct.

A further advantageous form of the invention is such that the outer side of the duct sections is provided with a radiation reflecting layer.

The invention furthermore contemplates the provision of radiation shields enclosing the duct sections so that the shields preferably provide a clearance from the outer side of the duct sections.

Other convenient forms of the invention are possible in which the duct sections are enclosed in compressed fiber glass, the duct sections are encased in a radiation reflecting foil which is wound and multiply overlapped, the duct sections are enclosed in a respective thermally insulating microporous solid body, or the insulating space is filled with a microporous material.

In order to impede the transfer of heat a further advantageous form of the invention is possible in which the duct sections are made of plastic, because such material has a lower thermal conductively than metallic ducts.

Since the amount of convection decreases with the size of cross section of the duct, in the case of a design with straight duct sections extending generally horizontally it is a great advantage if the cross section of these duct sections has a small vertical extent.

In the case of generally horizontally extending duct sections a further advantageous form of the invention is possible in which these duct sections are connected with the lower side of the inner container and extend under the inner container. This means that the heat discharged from the inner container will heat up the generally horizontal duct section so that the fluid located in the duct section wall have a temperature characteristic such that the temperature increases in an upward direction, this leading to a stable temperature variation in the layers of the fluid, while in the case of the arrangement over the inner container the cooling action will be at the top and the heating effect will be at the bottom and will lead to a circulation in the duct section.

Further features and advantages of the invention will be gathered from the ensuing description of several embodiments thereof referring to the drawings.

LIST OF THE SEVERAL VIEWS OF THE DRAWINGS

FIG. 1 is a diagrammatic vertical section taken through a first embodiment of an heat exchanger in accordance with the invention with ducts extending in a predominantly horizontal direction in the insulating space.

FIG. 2 is a vertical section in a section plane turned through 90°.

FIG. 3 is a diagrammatic section taken on the line III—III in FIG. 1 through one duct section, on a considerably enlarged scale.

FIG. 4 is a section, similar to that of FIG. 1, taken through a further possible embodiment of a heat storage means.

DETAILED DESCRIPTION OF WORKING EMBODIMENTS OF THE INVENTION

In all the sectional views the structure of the storage core has been omitted and is not shown Like or corresponding elements are denoted by like references.

The figures show a heat storage means in cylindrical form whose cylinder axis is vertical when the means is installed. The storage core, not shown, which directly constitutes the means serving for heat storage, is enclosed within an inner container 10. The inner container 10 is surrounded by an outer container 12 with a clearance therebetween serving to form an insulating space 14. The insulating space is preferably evacuated. It may contain a microporous insulating material.

A supply duct 16 and a return duct 18 for a heat vehicle fluid, as for instance the cooling water of an IC engine, open at the lower end wall 20 into the inner container 10 so that the end wall 20 is firstly adjoined by short vertical duct sections 16a and, respectively, 18a, which via bends 44 merge with horizontal duct sections 16b and, respectively, 18b, which extend laterally out of the outer container. The opening into the inner container 10 is in this respect so offset form the center of the end wall 20 that there is the greatest possible length of the horizontal duct sections 16b and 18b, which equally keep to a certain distance from the end wall 20 of the inner container 10 and also from the end wall 20, opposite thereto, of the outer container 12.

When the circulation of the heat vehicle fluid is interrupted, as for instance when the motor vehicle is not being used, the cooling water of the vehicle being used for charging up the heat storage means, the duct part, located outside the heat storage means, cools in relation to the hot storage core so that there is a temperature gradient between the storage core and the outer duct part. Owing to the greater density of the cooler fluid the latter will remain at the bottom in the vertical duct sections, while the hotter fluid with a lower density will remain at the top so that in the vertical duct section a barrier layer may be formed if heat transfer in a direction across the direction of the duct does not lead to convection interfering with the formation of such barrier layer.

Even if the barrier layer is able to form without any interference, in the case of the heat storage means illustrated the length of the vertical duct sections 16a and 18a is not great enough to achieve a sufficient insulating effect.

This insulating effect is thus produced by substantially preventing the convention in the horizontal duct sections 16b and 18b It is a familiar fact that in the case of relatively thin flow layers convection is not able to take place, for which reason the horizontal duct sections 16b and 18b are provided with permanently installed elements, which divide up the fluid flows in these sections 16b and 18b in such a manner that the periphery contacted by the fluid is so large in relation to the flow cross section that convection is substantially prevented.

One possible embodiment of such an element is shown in detail in FIG. 3. The cross section of the horizontal duct section 16b shown in this case comprises a spirally wound element 31, whose turns 33 keep to a small clearance between them, such clearance being set by the dent-like projections 35, which are made in the element 31.

A similar effect may be achieved, if in a manner which is not illustrated, the cross section in the duct sections 16b and 18b is subdivided by a number of parallel walls into separate flat channels extending in the direction of flow.

It is furthermore possible to have an arrangement of pressed glass fibers, predominantly extending in the direction of flow, in the duct sections 16b and 18b to achieve the desired ratio between the periphery contacted by the liquid and the flow cross section.

In order to prevent the promotion of convection in these duct sections 16b and 18b by removal of heat taking place across the direction of the ducts, the element 31 is preferably made of a thermally insulating material. Furthermore, the parallel walls mentioned above are preferably made of such a material. For the same purpose it is possible for the parts the ducts, or at any rate the ducts sections in which convection is to be hindered, to be made of plastic.

The undesired transmission of heat may be in addition by prevented by measures insuring insulation on the outer face of the duct sections 16b and 18b. In particular, it is possible for the outer face 37 of the duct sections 16b and 18b to be provided with a radiation reflecting coating. It is also possible to cover the ducts sections 16b and 18b with insulating layers 39, as for instance by winding a radiation reflecting foil thereon or by surrounding the same with a pressed fiber glass material using a microporous solid body, although the arrangement of radiations shields 41 around these duct sections is a suitable way of precluding the transmission of heat in the transverse direction.

Another way of supplementing such measures for suppressing convection in the horizontal duct sections 16b and 18b is, as may be seen from FIG. 2, making these duct sections with a flat form, which has its greater extent in the horizontal direction.

In the case of this arrangement the transmission of heat from the inner container 10 to the surface of the duct sections 16b and 18b and from the lower end thereof to the outer container 12 even aids the formation of a stabile stratification or layer formation in the fluid located in these duct sections.

In the embodiment in accordance with FIG. 4 it is assumed that owing to the manner in which installation has been performed, the ducts 16' and 18' are connected with the upper end wall 50 of the inner container and thence extend outwards in a vertical direction through the outer container 12. Since in this case during the storage phase the hot fluid is at the bottom and the cold fluid on the other hand is at the top, it is not possible for a stable barrier layer to form. In order to ensure sufficient thermal insulation one of the above-described elements, as for instance the element 31, is installed in these vertical ducts 16' and 18' as well in order to substantially prevent convection.

I claim:

1. A heat storage means, and more particularly to a latent heat storage means for motor vehicle heating systems supplied by engine waste heat, comprising an inner container with a storage core within it, an outer container (12) surrounding the inner container with a clearance with the formation of a preferably evacuated insulating space (14) and two ducts (16 and 18) extending through the insulating space (14), of which one duct serves as a supply duct and of which the other serves as a return duct for a heat vehicle fluid and both are arranged adjacent to the insulating space (14) in such a manner that they have a straight section (16b and 18b) which is as long as possible, characterized in that the cross section of the straight duct sections have such a dense arrangement of permanently installed elements extending in the direction of flow that in comparison with the flow cross section the periphery contacted by the fluid is so large that convection is substantially prevented.

2. The heat storage means as claimed in claim 1, characterized in that the ducts (16 and 18) have, between the inner container (10) and the straight horizontal section (16b and 18b), a respective duct section, which in the installed setting of the heat storage means has duct sections (16a and 18a) extending at least approximately vertically downwards.

3. The heat storage means as claimed in claim 1 or in claim 2, characterized in that the elements form narrow channels extending in the duct direction.

4. The heat storage means as claimed in any one of the preceding claims 1 through 3, characterized in that the cross section of the duct sections (26) is filled with a fiber glass plate whose fibers are predominantly aligned with the direction of the duct.

5. The heat storage means as claimed in any one of the preceding claims 1 through 3, characterized in that the cross section of the duct sections (26) comprises a number of parallel walls defining gaps between them and extending in the longitudinal direction of the duct.

6. The heat storage means as claimed in claim 5, characterized in that the walls consist of a thermally insulating material.

7. The heat storage means as claimed in claim 1 or in claim 2, characterized in that the duct sections (26) comprise an element (31) filling up the cross section of the sections in a spiral manner and having a clearance between its turns (33).

8. The heat storage means as claimed in claim 7, characterized in that the element (31) is provided with projections (35) setting the distance between its turns (33).

9. The heat storage means as in claim 1, characterized in that the duct sections (16b and 18b) containing the internally mounted elements are provided with an arrangement for preventing the supply of heat and the removal of heat in a direction across the direction of the duct.

10. The heat storage means as claimed in claim 9, characterized in that the center side (37) of the duct sections (26) is provided with a layer reflecting radiation.

11. The heat storage means as claimed in claim 9 or in claim 10, characterized in that the duct sections (16b and 18b) are enclosed in radiation shields (41).

12. The heat storage means as claimed in claim 11, characterized in that the radiation shields (41) are set at a distance from the outer face (37) of the duct sections (16b and 18b).

13. The heat storage means as claimed in claim 9, characterized in that the duct sections (16b and 18b) are enclosed by compressed fiber glass.

14. The heat storage means as claimed in claim 9, characterized in that the duct sections (16b and 18b) are encased by a multiply overlapped, wound radiation reflecting foil.

15. The heat storage means as claimed in claim 9, characterized in that the duct sections (16b and 18b) are in each case surround by a thermally insulating microporous solid body (39).

16. The heat storage means as claimed in claim 9, characterized in that the insulating space (14) is filled out by a microporous material.

17. The heat storage means as in claim 1, characterized in that in the case of the duct sections (16b and 18b) being generally horizontal, the cross section of such duct sections has a small vertical extent.

18. The heat storage means as in claim 1, characterized in that in the case of the duct sections (16b and 18b) extending generally horizontally, such duct sections are connected with the lower side of the inner container and extend under the inner container.

19. The heat storage means as in claim 1, characterized in that at least the duct section (16b and 18b) having with the elements fitting within them consist of plastic.

* * * * *

UNITED STATES PATENT AND TRADEMARK OFFICE
CERTIFICATE OF CORRECTION

PATENT NO. : 5,090,474

DATED : February 25, 1992

INVENTOR(S) : Oskar Schatz

It is certified that error appears in the above-identified patent and that said Letters Patent is hereby corrected as shown below:

Column 2, line 15,
"the" should be --them--.

Column 2, line 17,
"o" should be --of--.

Column 2, line 58,
"wall" should be --will--.

Column 3, line 21,
after "shown", insert --.--.

Column 3, line 67,
"convention" should be --convection--.

Column 3, line 68,
after "18b" insert --.--.

Column 4, line 36,
"by" (first occurrence) should be --be--.

Column 4, line 57,
after "stabile", insert --thermal--.

UNITED STATES PATENT AND TRADEMARK OFFICE
CERTIFICATE OF CORRECTION

PATENT NO. : 5,090,474
DATED : February 25, 1992
INVENTOR(S) : Oskar Schatz

It is certified that error appears in the above-identified patent and that said Letters Patent is hereby corrected as shown below:

Column 6, line 13, claim 10,
          "center" should be --outer--.

Signed and Sealed this

Twelfth Day of October, 1993

*Attest:*

BRUCE LEHMAN

*Attesting Officer*      *Commissioner of Patents and Trademarks*